United States Patent
Drake et al.

(10) Patent No.: US 10,063,144 B2
(45) Date of Patent: Aug. 28, 2018

(54) MULTIPHASE BUCK CONVERTER AND METHOD FOR OPERATING THE SAME

(71) Applicant: TAIWAN SEMICONDUCTOR MANUFACTURING COMPANY LTD., Hsinchu (TW)

(72) Inventors: Alan Drake, Round Rock, TX (US); Eric Soenen, Austin, TX (US); Alan Roth, Leander, TX (US); Russell Kinder, Austin, TX (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 32 days.

(21) Appl. No.: 15/335,089

(22) Filed: Oct. 26, 2016

(65) Prior Publication Data

US 2018/0115242 A1 Apr. 26, 2018

(51) Int. Cl.
*G05F 1/56* (2006.01)
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01)

(58) Field of Classification Search
CPC .................................................. H02M 3/335
USPC .......................................... 323/271–289, 315
See application file for complete search history.

(56) References Cited

U.S. PATENT DOCUMENTS

| | | | | |
|---|---|---|---|---|
| 7,132,891 B1* | 11/2006 | Dening | ................. | H03F 1/0227 330/133 |
| 7,453,250 B2* | 11/2008 | Qiu | ..................... | H02M 3/1584 323/282 |
| 8,188,721 B2* | 5/2012 | Isham | ................... | H02M 3/156 323/282 |
| 8,400,121 B2* | 3/2013 | Kudo | ................. | H02M 3/1584 323/266 |
| 8,729,872 B2* | 5/2014 | Yu | ....................... | H02M 3/1584 323/271 |
| 8,766,716 B2* | 7/2014 | Paek | ..................... | H03F 3/2178 330/10 |
| 9,401,639 B2* | 7/2016 | Philbrick | .............. | H02M 3/158 |

OTHER PUBLICATIONS

Kurd, N., Chowdhury, M., Burton, E., Thomas, T. P., Mozak, C., Boswell, B., . . . Kumar, R. (2015). Haswell: A Family of IA 22 nm Processors. IEEE Journal of Solid-State Circuits, 50(1), 49-58. doi:10.1109/jssc.2014.2368126.

* cited by examiner

*Primary Examiner* — Adolf Berhane
*Assistant Examiner* — Nusrat Quddus
(74) *Attorney, Agent, or Firm* — WPAT, P.C., Intellectual Property Attorneys; Anthony King

(57) ABSTRACT

A multi-phase buck converter comprises a first comparator, a second comparator and a counter. The first comparator has a first node connected to a first voltage reference and a second node. The second comparator has a first node connected to a second voltage reference and a second node. The second node of the second comparator and the second node of the first comparator are together connected to an input voltage from an active phase of the buck converter. The counter is configured to adjust a number of active phases of the buck converter based on the input voltage.

20 Claims, 7 Drawing Sheets

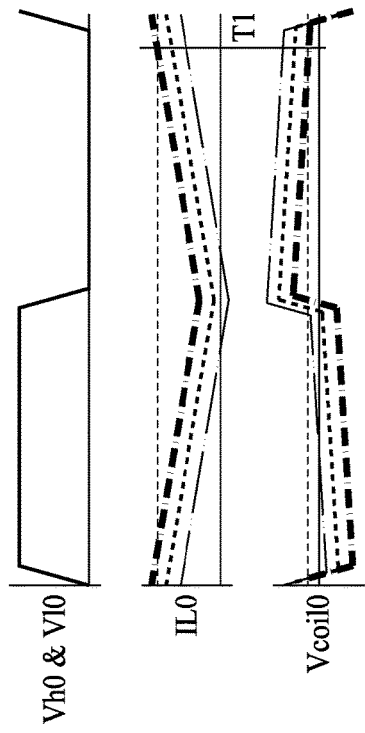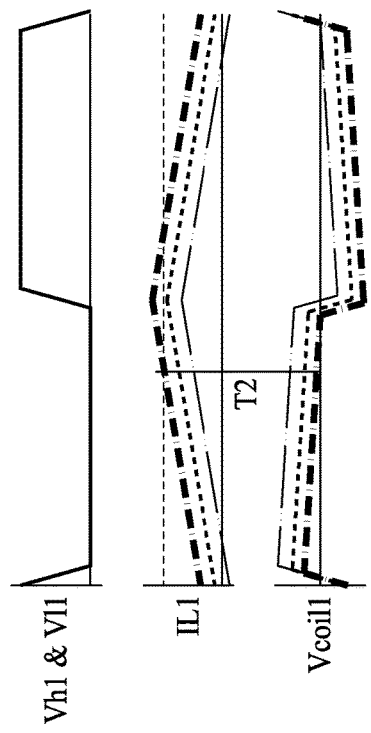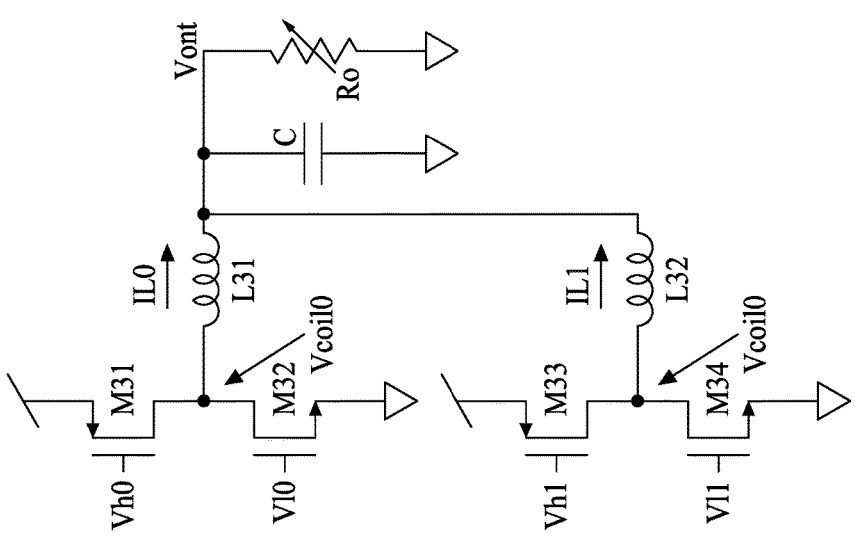

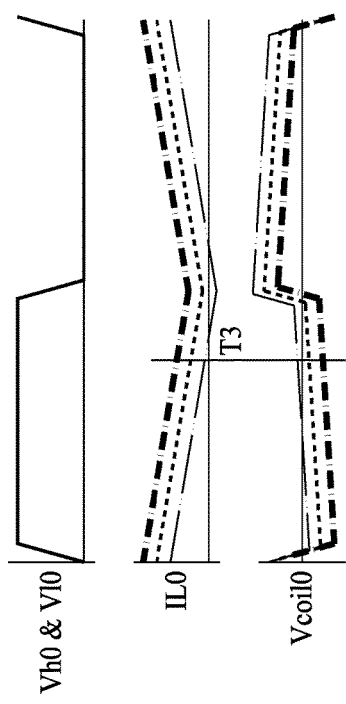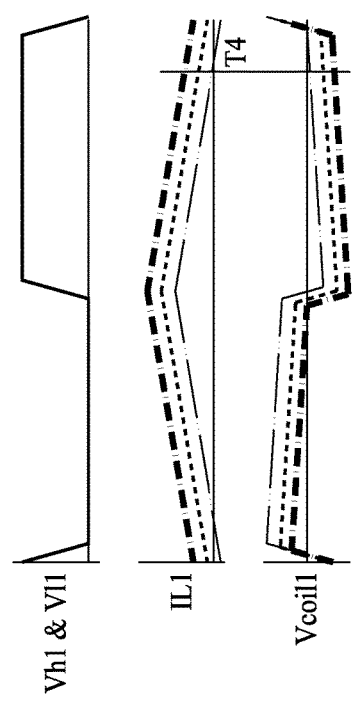

MULTIPHASE BUCK CONVERTER AND METHOD FOR OPERATING THE SAME

BACKGROUND

A multiphase buck converter is a DC to DC converter that provides multiple output modes including low and high voltages providing low and high-currents, which are required by microprocessors, memory banks, and ASICs, for example. When the circuit is operated in high current, a large number of phases are required. In contrast, when the circuit is operated in low current, there will be too many redundant phases. It is desirable to develop a multiphase buck converter to maintain high regulator efficiency over a widely varying load current.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

FIG. 3A is circuit diagram of a buck converter in part, in accordance with some embodiments.

FIGS. 3B-3E are timing diagrams of the bulk converter illustrated in FIG. 3A, in accordance with some embodiments.

Like reference symbols in the various drawings indicate like elements.

DETAILED DESCRIPTION

Figure 1:
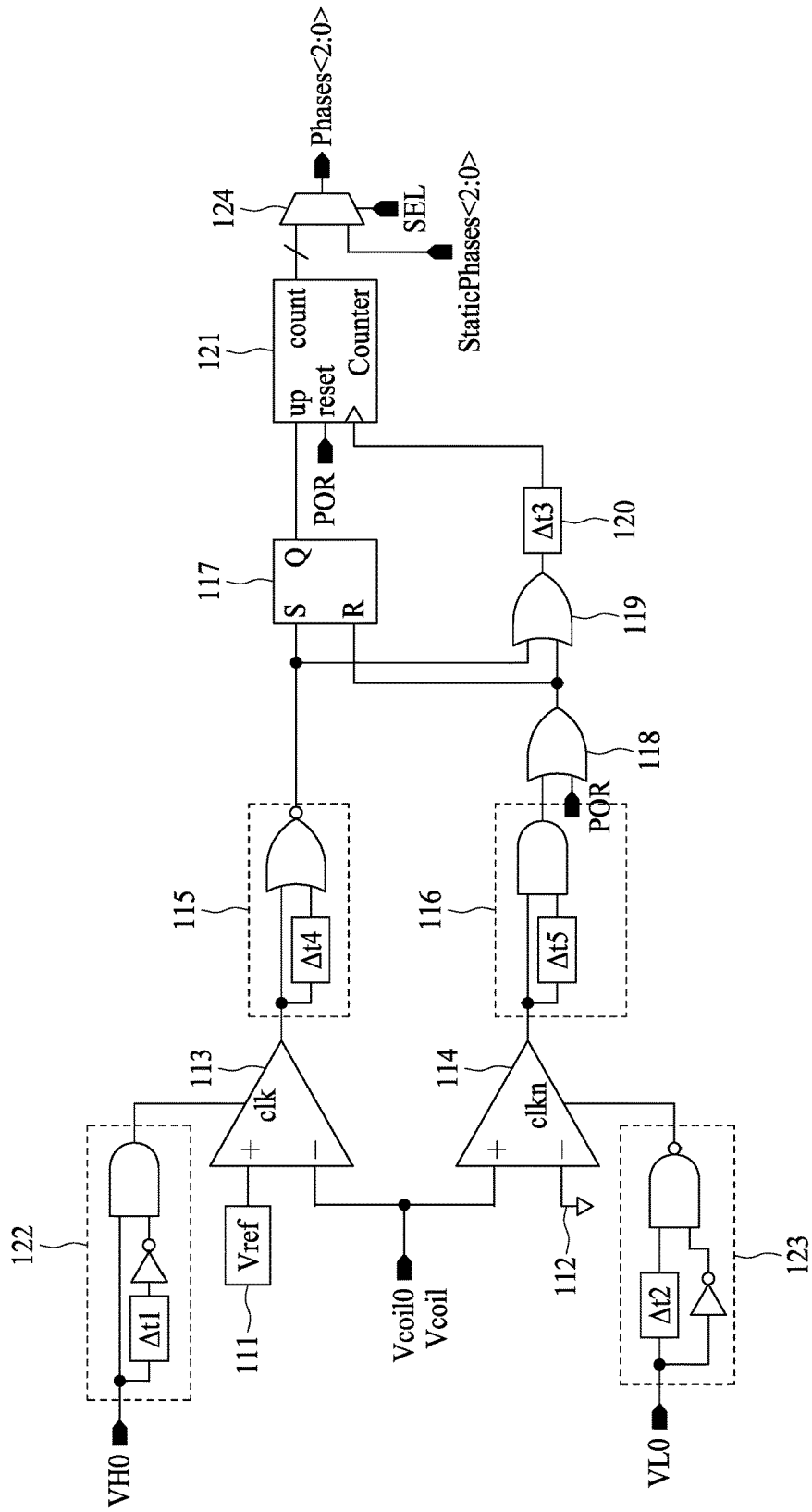
FIG. 1 is a block diagram of a phase controller, in accordance with some embodiments.

Embodiments, or examples, of the disclosure illustrated in the drawings are now described using specific language. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numerals may be repeated throughout the embodiments, but this does not necessarily require that feature(s) of one embodiment apply to another embodiment, even if they share the same reference numeral.

FIG. 1 illustrates a block diagram of a phase controller 1 in accordance with some embodiments of the present disclosure. The phase controller 1 comprises a first comparator 113, a second comparator 114, a first pulse width controller 115, a second pulse width controller 116, an SR latch 117, a timing delay controller 120, a counter 121, a first clock pulse controller 122 and a second clock pulse controller 123 and a multiplexer 124.

The first comparator 113 comprises a positive node (labeled "+") and a negative node (labeled "−"). The positive node of the first comparator 113 is connected to a high-voltage reference. The second comparator 114 comprises a positive node (labeled "+") and a negative node (labeled "−"). The positive node of the second comparator 114 is connected to a low-voltage reference. The negative node of the first comparator 113 and the negative node of the second comparator 114 are together connected to a voltage input Vcoil from an active phase of the buck converter 2 shown in FIG. 2. The high-voltage reference is established based on the voltage generated in a power MOSFET when a maximum current allowed in a single phase is drawn. The low-voltage reference is established in the case that the current is no longer supplied to a load of the buck converter 2 shown in FIG. 2. In some embodiments, the low-voltage reference is substantially ground or near ground.

The voltage input Vcoil, connected to the negative nodes of the first comparator 113 and the second comparator 114, is to be compared with the high-voltage reference and the low-voltage reference. If there is too much current in individual phases, the first comparator 113 would generate a pulse. If the current provided to the load is insufficient, the second comparator 114 would generate a pulse. In some embodiments, the first comparator 113 and the second comparator 114 are synchronous. Alternatively, the first comparator 113 and the second comparator 114 are asynchronous.

The first pulse width controller 115 comprises a NOR gate and a delay circuit. The second pulse width controller 116 comprises an AND gate and a delay circuit. The first pulse width controller 115 is configured to receive a pulse from the first comparator 113 and send the pulse signal to the set node of the SR latch 117. The second pulse width controller 116 is configured to receive a pulse from the second comparator 114 and send the pulse signal to the reset node of the SR latch 117.

The SR latch 117 is configured to receive a pulse generate by the first comparator 113 or the second comparator 114. The pulse generated by the first comparator 113 is used to set the SR latch 117 (e.g., count up). The pulse generated by the second comparator 114 is used to reset the SR latch 117 (e.g., count down).

The outputs of the first comparator 113 and the second comparator 114 drive the SR latch 117 to provide an up signal to the counter 121. When the up signal is detected, the counter 121 counts up. When the up signal is not detected, the counter 121 counts down. In addition, the outputs of the first comparator 113 and the second comparator 114 are delayed by a timing delay controller 120 and then used to clock the counter 121. The clock signal for the counter 121 is delayed sufficiently to provide protection against setup/hold timing of the up/down signal before latches inside the counter 121 are latched.

The counter 121 is an n-bit counter, in which n represents the number of phases to be turned on or turned off. The counter 121 is configured to receive the clock signal generated by the first comparator 113 or the second comparator 114 and to output an enable or disable signal to turn on or turn off the phases, respectively. In some embodiments, the counter 121 would count sequentially or geometrically. In some embodiments, the output of the counter 121 can be coded to turn on or turn off the phases linearly, geometrically, logarithmically and the like. In the present embodiment, an output of the counter 121 is connected to the multiplexer 124. Alternatively, the counter 121 could directly send a signal to turn on or turn off the phases without the multiplexer 124. Since the counter 121 is clocked by the first comparator 113 and the second comparator 114, the counter 121 is self-timed and no additional clock is required, which would in turn reduce the power consumption and increase the accuracy.

The counter 121 would saturate at a minimum value under the condition of all phases off except for the always-active phase. The counter 121 would saturate at a maximum value under the condition of all phases on.

In some existing buck converters, the phases are adjusted after a failure signal is received. The buck converter 2 in FIG. 2 can dynamically adjust the phases to be turned or turned off based on the output of the first comparator 113 and the second comparator 114. Therefore, in comparison with the existing buck converters, the buck converter 2 shown in FIG. 2 is more efficient over a widely varying load current.

Each of the first and second clock pulse controllers 122, 123 comprises an AND gate or a NAND gate, an inverter and a delay circuit. The first clock pulse controller 122 and the second clock pulse controller 123 respectively provide a clock to the first comparator 113 and the second comparator 114, which would reduce the power consumption of the first comparator 113 and the second comparator 114. The clock also times the comparison to the signal VCOIL to ensure proper timing of the comparator.

Figure 2:
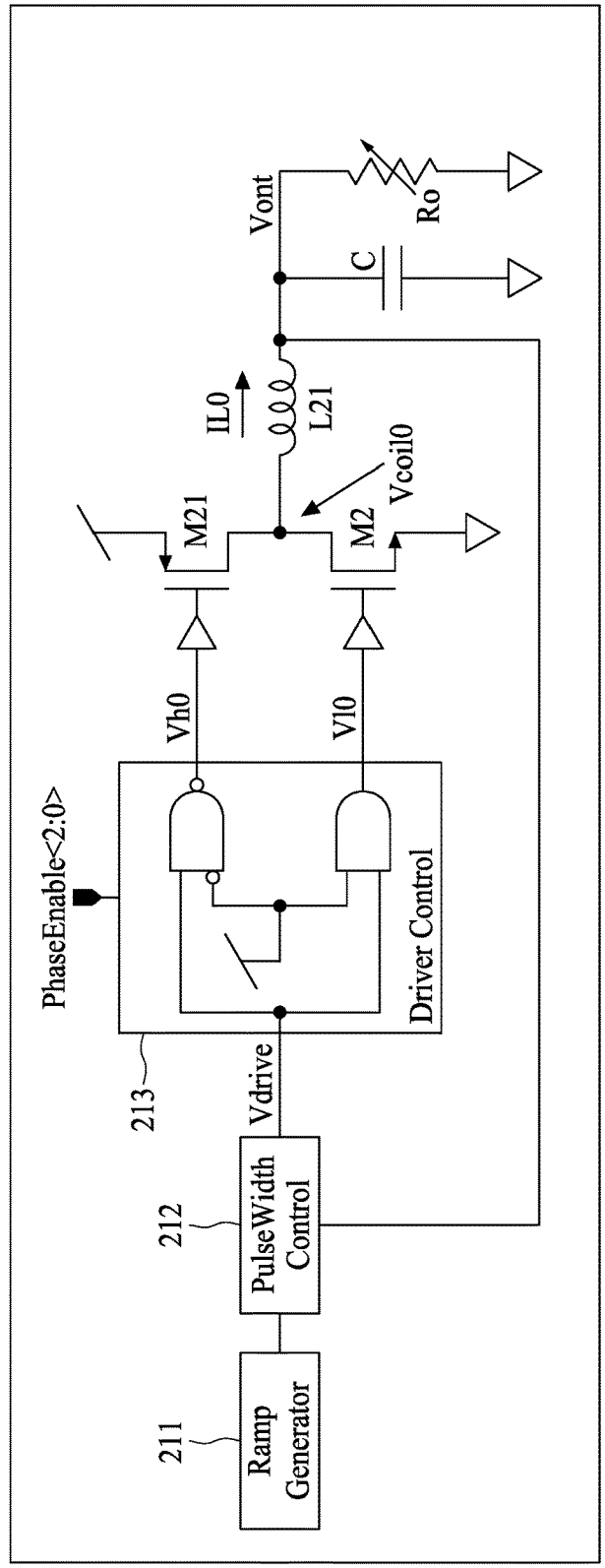
FIG. 2 is a block diagram of a buck converter, in accordance with some embodiments.

FIG. 2 illustrates a buck converter 2 with an always-active phase in accordance with some embodiments of the present disclosure. The buck converter 2 comprises a ramp generator 211, a pulse width controller 212, a driver controller 213, a PMOS M21 and an NMOS M22. A drain of the PMOS M21 and a drain of the NMOS M22 are connected to an inductor L21. A gate of the PMOS M21 is configured to receive a voltage Vh0 from the driver controller 213 and a gate of the NMOS M22 is configured to receive a voltage Vl0 from the driver controller 213.

The ramp generator 211 is configured to generate a periodic ramp signal to control the duty cycle of the clock in order to drive the PMOS M21 and NMOS M22 power headers. The duty cycle determines the output voltage Vout of the buck converter 2. In accordance with the present disclosure, because the buck converter 2 has at least one phase that is always active, currents are balanced across phases in a well-designed circuit. By doing so, only a single phase needs to be monitored since all phases show similar phase shifted, current and voltage values. Therefore, multiple phases can be controlled by a single phase, which would reduce the total size of a chip and power consumption.

FIG. 3A illustrates a part of a buck converter with multiple (two in this instance) phases in accordance with some embodiments of the present disclosure. A drain of a first PMOS M31 and a drain of a first NMOS M32 are connected to an inductor L31. A gate of the first PMOS M31 is configured to receive a voltage Vh0 and a gate of the first NMOS M32 is configured to receive a voltage Vl0. A drain of a second PMOS M33 and a drain of a second NMOS M34 are connected to an inductor L32. A gate of the second PMOS M33 is configured to receive a voltage Vh1 and a gate of the second NMOS M34 is configured to receive a voltage Vl1.

FIGS. 3B and 3C show timing diagrams for two phases of an n-phase buck converter under a high load-current condition. As shown in FIG. 3B, the load current exceeds the maximum current (dotted line) at time T1. In some embodiments, the maximum current is set according to characteristics of the inductor, power MOS, power distribution, etc. In some embodiments, each phase has two operation modes: a VDD phase and a ground phase. During the VDD phase, the voltages Vh0 and Vl0 are low, the pull-down first NMOS M32 is turned off and the pull-up first PMOS M31 is turned on. The voltage Vcoil0 at the drain of the first PMOS M31 and the drain of the first NMOS M32 is pulled up to VDD so that current flows from the supply to the inductor L31. Then the current rises linearly from a low value to a high value and the voltage Vcoil0 drops. The voltage Vcoil0 is inputted to the negative nodes of the first comparator 113 and the second comparator 114 of FIG. 2. When the voltage Vcoil0 is lower than the high-voltage reference, the first comparator 113 would send a pulse to the counter 121 to request additional phases to handle the large current.

Similarly, as shown in FIG. 3C, the load current exceeds the maximum current (dotted line) during the VDD phase (the voltage Vh1 and Vl1 are low) at time T2. The voltage Vcoil1 at the drain of the second PMOS M33 and the drain of the second NMOS M34 is pulled up to VDD and the current flow from the supply to the inductor L32. Then the current rises linearly from a low value to a high value and the voltage Vcoil1 drops. Because loads on phases are balanced in a well-designed Buck converter, when the voltage Vcoil1 is lower than the high-voltage reference, the first comparator 113 shown in FIG. 1 would send a pulse to the counter 121 to request additional phases to handle the large current.

FIGS. 3D and 3E show timing diagrams for two phases of an n-phase buck converter under a light load-current condition. In some embodiments, the light loading is characterized by the pull-down phase of the conversion. In this phase, the voltages Vh0 and Vl0 are high, turning on the first NMOS M32 and turning off the first PMOS M31. The current, which cannot change in the inductor L1 instantaneously, falls from the high value toward zero. If the current IL0 become negative at time T3 as shown in FIG. 3D, the first NMOS M32 would draw the current from the load rather than applying the current to the load. This would reduce the efficiency of the load. When the voltage Vcoil0 is lower than the low-voltage reference, the second comparator 114 would send a pulse to the counter 121 to turn off phases because of the reduced demand for the current.

Similarly, as shown in FIG. 3E, if the current IL1 becomes negative at T4, the second NMOS M34 would draw the current from the load rather than applying the current to the load. Because loads on phases are balanced in a well-designed Buck converter, when the voltage Vcoil1 is lower than the low-voltage reference, the second comparator 114 would send a pulse to the counter 121 to turn off phases.

Both of the first comparator 113 and the second comparator 114 need to be timed to do comparison just before transitioning to the next power phase. Therefore, the first comparator 113 should be timed at the end of the pull-up phase and the second comparator 114 should be timed at the end of the pull-down phase.

In the existing buck converters, the phases are adjusted after a failure signal is received. The buck converter in FIG. 3A can sense the load current to determine whether the current is too high or too low, so as to dynamically adjust the phases to be turned on or turned off. Therefore, in comparison with the existing buck converters, the buck converter shown in FIG. 3A is more efficient over a widely varying load current.

Figure 4:
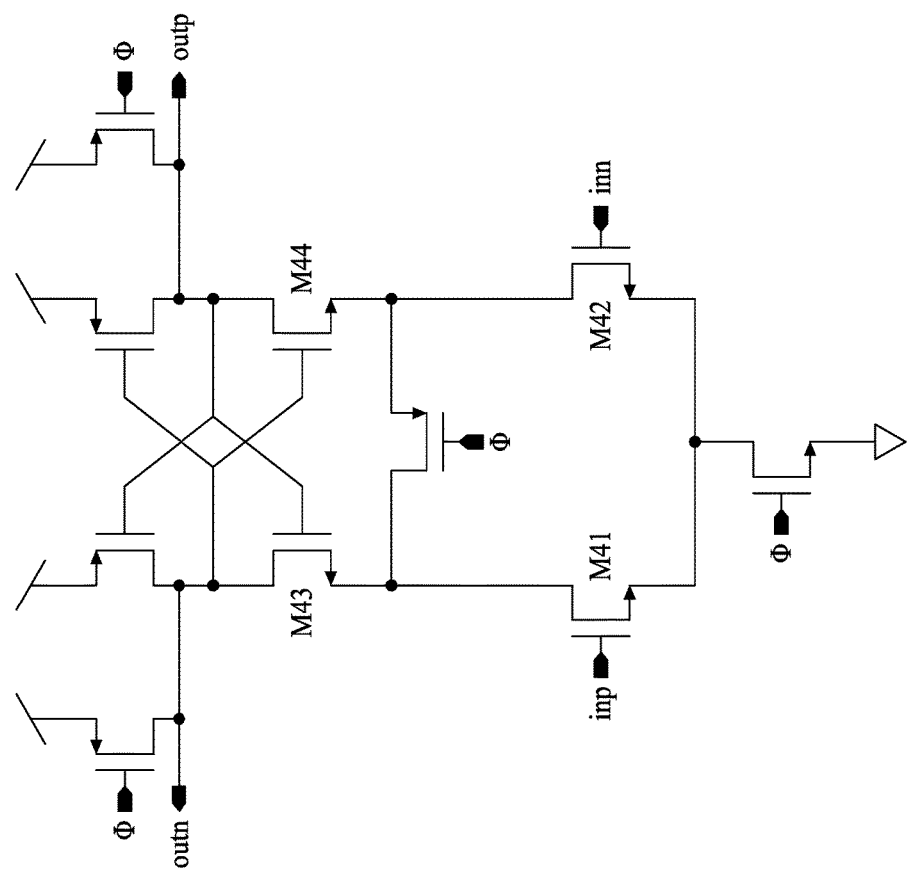
FIG. 4 is a circuit diagram of a comparator, in accordance with some embodiments.

FIG. 4 illustrates a circuit diagram of the first comparator 113 as shown in FIG. 1 in accordance with some embodiments of the present disclosure. As shown in FIG. 4, an NMOS input pair M41, M42 drives a cross-coupled latch pair M43, M44. The latch pair M43, M44 has a positive gain to amplify the differences at the input pair M41, M42 and generate a high voltage or a low voltage based on the voltage difference at the input pair M41, M42. The structure of the first comparator 113 shown in FIG. 4 is able to compare the voltages that are higher than VDD at the input pair M41, M42.

Figure 5:
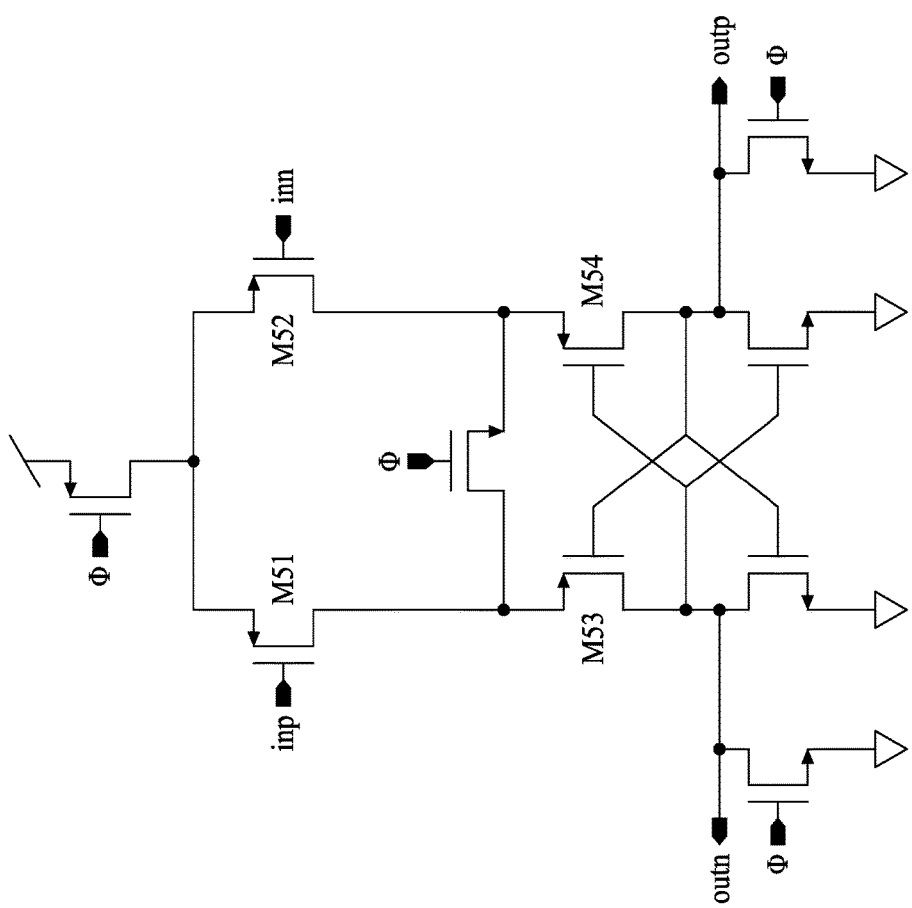
FIG. 5 is a circuit diagram of a comparator, in accordance with some embodiments.

FIG. 5 illustrates a circuit diagram of the second comparator 114 as shown in FIG. 1 in accordance with some embodiments of the present disclosure. As shown in FIG. 5, a PMOS input pair M51, M52 is used to drive a cross-coupled pair M53, M54. The cross-coupled pair M53, M54 is configured as a positive feedback to amplify the differences at the input pair M51, M52. The structure of the second comparator 114 shown in FIG. 5 is able to compare the voltages that are lower than a ground level (e.g., 0V) at the input pair M51, M52.

Figure 6:
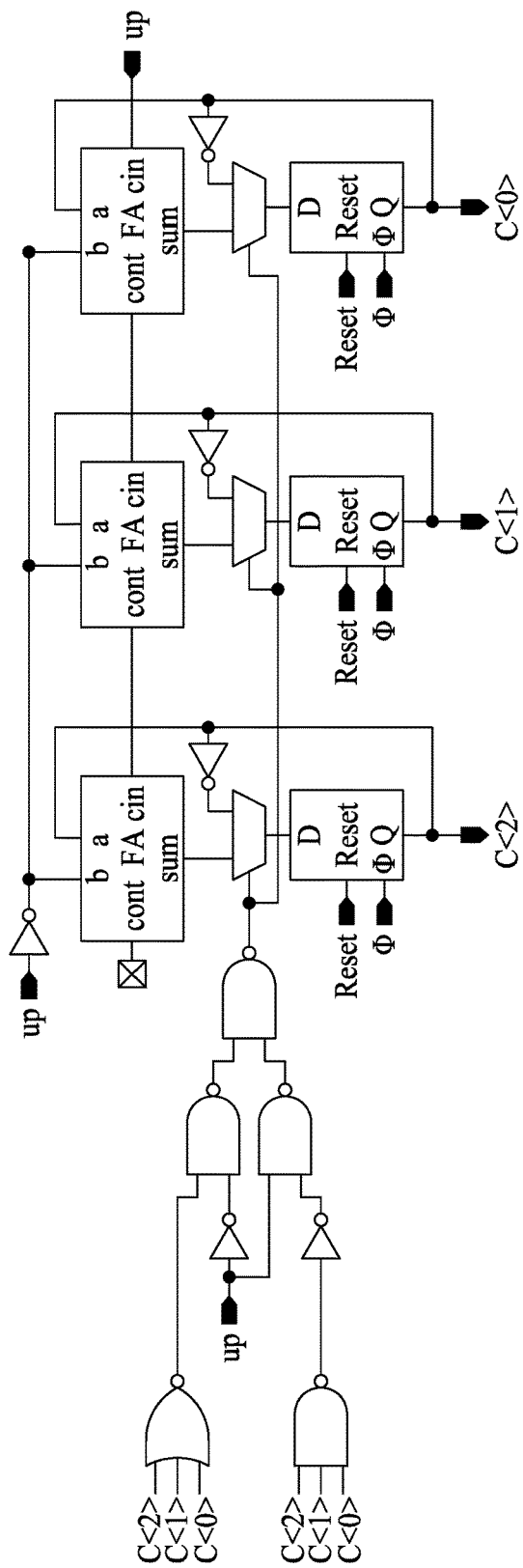
FIG. 6 is a circuit diagram of a counter, in accordance with some embodiments.

FIG. 6 illustrates a circuit diagram of the counter 121 as shown in FIG. 1 in accordance with some embodiments of the present disclosure. The counter 121 shown in FIG. 6 is a 3-bit up/down counter. In some embodiments, the counter 121 can be an n-bit up/down counter. If the bit patterns at C(0), C(1) and C(2) are "000" or "111," the counter would saturate. Without saturation, in the case of "111," the counter 121 would turn off all of the phases if the current flowing to the load is too high since the next state would be "000". When this condition is reached, an error flag and a count of cycles requesting additional phases would signal the system that the maximum current condition is reached and the buck converter is over-extended. The system could then reduce the current flowing to the load in response to the error flag. The counter 121 shown in FIG. 6 allows the high current to keep tripping the high-voltage reference even if all phases are on because the counter will not advance past "111".

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing outlines features of several embodiments so that persons having ordinary skill in the art may better understand the aspects of the present disclosure. Persons having ordinary skill in the art should appreciate that they may readily use the present disclosure as a basis for designing or modifying other devices or circuits for carrying out the same purposes or achieving the same advantages of the embodiments introduced therein. Persons having ordinary skill in the art should also realize that such equivalent constructions do not depart from the spirit and scope of the present disclosure, and that they may make various changes, substitutions and alternations herein without departing from the spirit and scope of the present disclosure.

What is claimed is:

1. A multi-phase buck converter, comprising:
    a first comparator having a first node and a second node, the first node of the first comparator connected to a first voltage reference;
    a second comparator having a first node and a second node, the first node of the second comparator connected to a second voltage reference, wherein the second node of the second comparator and the second node of the first comparator are together connected to an input voltage from an active phase of the buck converter; and
    a counter configured to adjust a number of active phases of the buck converter based on the input voltage.

2. The buck converter of claim 1, further comprising a SR latch connected to receive outputs from the first comparator and the second comparator and to send signal to the counter.

3. The buck converter of claim 2, wherein if the input voltage is lower than the first voltage reference, the first comparator sends a pulse to the SR latch to set the SR latch.

4. The buck converter of claim 3, wherein when a current of the phase driver exceeds a first predetermined value, the input voltage is lower than the first voltage reference.

5. The buck converter of claim 2, wherein if the input voltage is lower than the second voltage reference, the second comparator sends a pulse to the SR latch to reset the SR latch.

6. The buck converter of claim 5, wherein when a current of the phase driver less than a second predetermined value, the input voltage is lower than the second voltage reference.

7. The buck converter of claim 1, further comprising an always-active phase driver.

8. The buck converter of claim 1, wherein the counter is clocked by the first comparator and the second comparator.

9. The buck converter of claim 1, wherein the first comparator comprising an NMOS input pair and a cross-coupled NMOS pair.

10. The buck converter of claim 1, wherein the second comparator comprising a PMOS input pair and a cross-coupled PMOS pair.

11. The buck converter of claim 1, wherein the first comparator and the second comparator are clocked.

12. The buck converter of claim 1, wherein the counter has a 3-bit input, and the counter saturates if the 3-bit input is 000 or 111.

13. A method of changing a number of phases in a multi-phase buck converter, comprising:
    (a) receiving an input voltage from an active phase;
    (b) comparing the input voltage with a first voltage reference and a second voltage reference; and
    (c) adjusting the number of phases based on the input voltage;
    wherein operation (c) further comprises increasing the number of the phases if the input voltage is less than the first voltage reference.

14. The method of claim 13, wherein when a current in a single phase is higher than a first predetermined value, the input voltage is less than the first voltage reference.

15. The method of claim 13, wherein operation (c) further comprises decreasing the number of the phase if the input voltage is less than the second voltage reference.

16. The method of claim 15, wherein when a current in a single phase is lower than a second predetermined value, the input voltage is less than the second voltage reference.

17. The method of claim 13, wherein at least one phase is always active.

18. The method of claim 13, wherein the first voltage reference is greater than the second voltage reference.

19. The method of claim 13, further comprising turning on or turning off the phases linearly, geometrically or logarithmically.

20. A method of changing a number of phases in a multi-phase buck converter, comprising:
    (b) receiving an input voltage from an active phase;
    (b) comparing the input voltage with a first voltage reference and a second voltage reference; and
    (c) adjusting the number of phases based on the input voltage;

wherein operation (c) further comprises decreasing the number of the phase if the input voltage is less than the second voltage reference.

\* \* \* \* \*